R. BALLANTYNE.
BENCH PIPE CONNECTION.
APPLICATION FILED APR. 8, 1910.
980,901.
Patented Jan. 10, 1911.
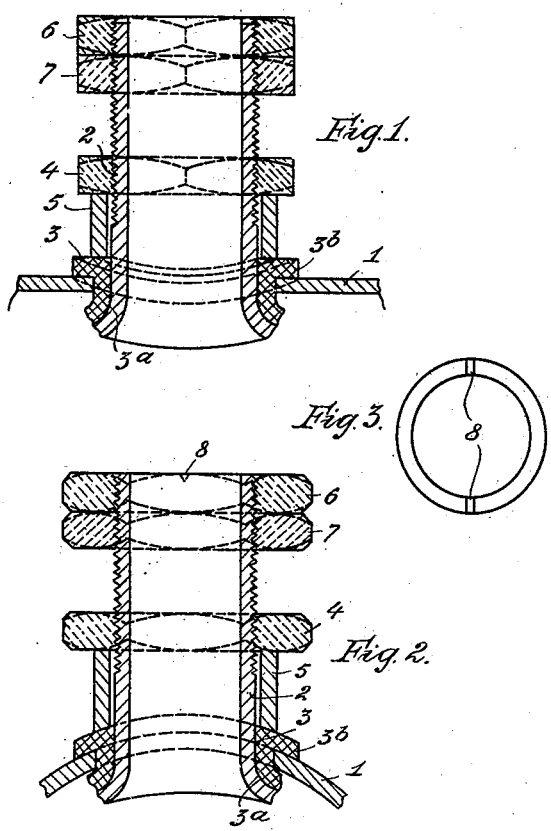

UNITED STATES PATENT OFFICE.

ROBERT BALLANTYNE, OF GLASGOW, SCOTLAND, ASSIGNOR TO STEWARTS & LLOYDS, LIMITED, OF COATBRIDGE, SCOTLAND.

BRANCH PIPE CONNECTION.

980,901.  Specification of Letters Patent.  Patented Jan. 10, 1911.

Application filed April 8, 1910. Serial No. 554,218.

*To all whom it may concern:*

Be it known that I, ROBERT BALLANTYNE, a subject of the King of the United Kingdom of Great Britain and Ireland, and residing at Glasgow, Scotland, have invented a certain new and useful Improvement in Branch Pipe Connections, of which the following is a specification.

This invention relates to improvements in branch service connections to gas, water, air or other mains; the object in view being to simplify the operation of taking a branch off a main and to simplify the means employed for this purpose.

The invention will be understood by reference to the accompanying drawings in which—

Figures 1 and 2 are sectional views at right angles to one another showing the main pipe fitted with a nipple for attachment to a branch connection, with the devices for securing the nipple in place. Fig. 3 shows a detail.

The drawings show that an orifice has been cut or drilled in the main 1 into which is inserted the nipple 2 which is tapered or expanded or flared at the end which enters the main and which is also screw-threaded over part of its length. Over the nipple is passed a lead or like washer 3 comprising a tubular portion 3ª which projects into the main and an annular flange portion 3ᵇ which bears on the outer surface of the main. Between said flange portion and a nut 4 in screw-threaded engagement with the nipple 2 is interposed a distance piece 5. The nipple is drawn outwardly by rotating the nut 4 and in consequence of the pressure of the thickened or expanded or flared end of the nipple on the washer 3, the tubular portion of the washer is caused to assume the form illustrated in the drawings and being pressed against the inner surface of the main provides a tight joint between the nipple and the main. Two jam nuts 6, 7 at the outer end of the nipple afford a means of holding the nipple in position while the nut 4 is being tightened up. The outer end of the nipple may be formed with grooves or notches, as at 8, (Figs. 2 and 3) to be kept in line with the center of the main when the nut 4 is being screwed up; the grooves or notches 8 providing a check against displacement of the nipple.

Having now described my invention what I claim and desire to secure by Letters Patent of the United States is:—

1. The combination with a main pipe having an orifice, of a nipple screw-threaded over part of its length and one end of which is expanded and enters said orifice, a washer surrounding said nipple, said washer including a tubular portion which enters the orifice and is pressed between the expanded end of the nipple and the inner surface of the main pipe and a flange portion resting on the outer surface of the main pipe, a nut in screw-threaded engagement with the screw-threaded part of the nipple, and a distance piece acting as a strut interposed between the nut and the flange portion of the washer.

2. The combination with a main pipe having an orifice, of a nipple screw-threaded over part of its length and one end of which is expanded and enters said orifice, a washer surrounding said nipple, said washer including a tubular portion which enters the orifice and is pressed between the expanded end of the nipple and the inner surface of the main pipe and a flange portion resting on the outer surface of the main pipe, a nut in screw-threaded engagement with the screw-threaded part of the nipple, a distance piece acting as a strut interposed between the nut and the flange portion of the washer, and jam nuts in screw-threaded engagement with the outer end of said nipple.

In testimony whereof I have signed my name to this specification in the presence of two subscribing witnesses.

ROB. BALLANTYNE.

Witnesses:
 WALLACE CRANSTON FAIRWEATHER,
 JOHN McCLEARY, Jr.